United States Patent
Panusopone et al.

(10) Patent No.: US 9,210,442 B2
(45) Date of Patent: Dec. 8, 2015

(54) EFFICIENT TRANSFORM UNIT REPRESENTATION

(75) Inventors: Krit Panusopone, San Diego, CA (US); Xue Fang, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 990 days.

(21) Appl. No.: 13/328,948

(22) Filed: Dec. 16, 2011

(65) Prior Publication Data

US 2012/0177116 A1 Jul. 12, 2012

Related U.S. Application Data

(60) Provisional application No. 61/431,984, filed on Jan. 12, 2011.

(51) Int. Cl.
*H04N 7/12* (2006.01)
*H04N 19/61* (2014.01)
*H04N 19/159* (2014.01)
*H04N 19/176* (2014.01)
*H04N 19/46* (2014.01)
*H04N 19/122* (2014.01)

(52) U.S. Cl.
CPC ............. *H04N 19/61* (2014.11); *H04N 19/122* (2014.11); *H04N 19/159* (2014.11); *H04N 19/176* (2014.11); *H04N 19/46* (2014.11)

(58) Field of Classification Search
CPC ... H04N 19/61; H04N 19/159; H04N 19/176; H04N 19/46; H04N 19/122
USPC .............................. 375/240.12; 348/97, 403.1
See application file for complete search history.

(56) References Cited

U.S. PATENT DOCUMENTS

| 4,774,574 A | 9/1988 | Daly et al. |
| 5,068,724 A | 11/1991 | Krause et al. |
| 5,091,782 A | 2/1992 | Krause et al. |
| 5,121,216 A | 6/1992 | Chen et al. |
| 5,146,324 A | 9/1992 | Miller et al. |
| 5,224,062 A | 6/1993 | McMillan, Jr. et al. |

(Continued)

FOREIGN PATENT DOCUMENTS

| JP | 2010199959 | 9/2010 |
| WO | 2010039822 A2 | 4/2010 |

(Continued)

OTHER PUBLICATIONS

Chen P. et al., "Video coding using extended block sizes," VCEG Meeting, San Diego, US; No. VCEG-AJ23, Oct. 15, 2008.

(Continued)

*Primary Examiner* — Allen Wong
(74) *Attorney, Agent, or Firm* — Young Basile Hanlon & MacFarlane P.C.

(57) ABSTRACT

In one embodiment, a method includes receiving a prediction unit (PU) for a coding unit (CU) of the video content. The method analyzes the prediction unit to determine a size of prediction unit. A size of a transform unit is determined based on the size of the prediction unit based on a set of rules. The set of rules specify the size of the transform unit is linked to the size of prediction unit and not a size of the coding unit. The method then outputs the size of the transform unit for use in a transform operation.

16 Claims, 7 Drawing Sheets

(56) References Cited

U.S. PATENT DOCUMENTS

| | | | |
|---|---|---|---|
| 5,235,623 | A | 8/1993 | Sugiyama et al. |
| 5,260,782 | A | 11/1993 | Hui |
| 5,274,442 | A | 12/1993 | Murakami et al. |
| 5,341,440 | A | 8/1994 | Earl et al. |
| 5,422,963 | A | 6/1995 | Chen et al. |
| 5,444,800 | A | 8/1995 | Kim |
| 5,635,938 | A | 6/1997 | Komoto |
| 5,737,020 | A | 4/1998 | Hall et al. |
| 5,767,908 | A * | 6/1998 | Choi .................... 348/403.1 |
| 5,872,866 | A | 2/1999 | Strongin et al. |
| 5,903,669 | A | 5/1999 | Hirabayashi |
| 6,108,383 | A | 8/2000 | Miller et al. |
| 6,115,501 | A | 9/2000 | Chun et al. |
| 6,134,350 | A | 10/2000 | Beck |
| 6,167,161 | A | 12/2000 | Oami |
| 6,408,025 | B1 | 6/2002 | Kaup |
| 6,522,783 | B1 | 2/2003 | Zeng et al. |
| 6,522,784 | B1 | 2/2003 | Zlotnick |
| 6,683,991 | B1 | 1/2004 | Andrew et al. |
| 6,819,793 | B1 | 11/2004 | Reshetov et al. |
| 6,917,651 | B1 | 7/2005 | Yoo et al. |
| 6,934,419 | B2 | 8/2005 | Zlotnick |
| 7,266,149 | B2 | 9/2007 | Holcomb et al. |
| 7,292,634 | B2 | 11/2007 | Yamamoto et al. |
| 7,492,823 | B2 | 2/2009 | Lee et al. |
| 7,894,530 | B2 | 2/2011 | Gordon et al. |
| 7,912,318 | B2 | 3/2011 | Nakayama |
| 7,936,820 | B2 | 5/2011 | Watanabe et al. |
| 8,000,546 | B2 | 8/2011 | Yang et al. |
| 8,094,950 | B2 | 1/2012 | Sasagawa |
| 8,582,656 | B2 | 11/2013 | Lin et al. |
| 8,687,699 | B1 | 4/2014 | Wen |
| 2002/0168114 | A1 | 11/2002 | Valente |
| 2002/0196983 | A1 | 12/2002 | Kobayashi |
| 2003/0048943 | A1 | 3/2003 | Ishikawa |
| 2003/0146925 | A1 | 8/2003 | Zhao et al. |
| 2004/0057519 | A1 | 3/2004 | Yamamoto et al. |
| 2004/0125204 | A1* | 7/2004 | Yamada et al. .................. 348/97 |
| 2004/0179820 | A1 | 9/2004 | Kashiwagi et al. |
| 2004/0184537 | A1 | 9/2004 | Geiger et al. |
| 2005/0025246 | A1 | 2/2005 | Holcomb |
| 2005/0147163 | A1 | 7/2005 | Li et al. |
| 2005/0249291 | A1 | 11/2005 | Gordon et al. |
| 2006/0045368 | A1 | 3/2006 | Mehrotra |
| 2006/0098738 | A1 | 5/2006 | Cosman et al. |
| 2006/0115168 | A1 | 6/2006 | Kobayashi |
| 2006/0133682 | A1 | 6/2006 | Tu et al. |
| 2006/0210181 | A1 | 9/2006 | Wu et al. |
| 2006/0239575 | A1 | 10/2006 | Abe et al. |
| 2006/0251330 | A1 | 11/2006 | Toth et al. |
| 2007/0036223 | A1 | 2/2007 | Srinivasan |
| 2007/0078661 | A1 | 4/2007 | Sriram et al. |
| 2007/0140349 | A1 | 6/2007 | Burazerovic |
| 2007/0183500 | A1 | 8/2007 | Nagaraj et al. |
| 2007/0201554 | A1 | 8/2007 | Sihn |
| 2007/0211953 | A1 | 9/2007 | Sasagawa |
| 2007/0223583 | A1 | 9/2007 | Nagai et al. |
| 2008/0008246 | A1 | 1/2008 | Mukherjee et al. |
| 2008/0043848 | A1 | 2/2008 | Kuhn |
| 2008/0084929 | A1 | 4/2008 | Li |
| 2008/0123977 | A1 | 5/2008 | Moriya et al. |
| 2008/0253463 | A1 | 10/2008 | Lin et al. |
| 2008/0310512 | A1 | 12/2008 | Ye et al. |
| 2009/0041128 | A1 | 2/2009 | Howard |
| 2009/0049641 | A1 | 2/2009 | Pullins et al. |
| 2009/0067503 | A1 | 3/2009 | Jeong et al. |
| 2009/0123066 | A1 | 5/2009 | Moriya et al. |
| 2009/0228290 | A1 | 9/2009 | Chen et al. |
| 2009/0274382 | A1 | 11/2009 | Lin et al. |
| 2010/0020867 | A1 | 1/2010 | Wiegand et al. |
| 2010/0086049 | A1 | 4/2010 | Ye et al. |
| 2010/0246951 | A1 | 9/2010 | Chen et al. |
| 2010/0290520 | A1 | 11/2010 | Kamisli et al. |
| 2010/0309286 | A1 | 12/2010 | Chen et al. |
| 2011/0032983 | A1 | 2/2011 | Sezer |
| 2011/0090959 | A1 | 4/2011 | Wiegand et al. |
| 2011/0182352 | A1 | 7/2011 | Pace |
| 2011/0206135 | A1 | 8/2011 | Drugeon et al. |
| 2011/0286516 | A1 | 11/2011 | Lim et al. |
| 2011/0293009 | A1 | 12/2011 | Steinberg et al. |
| 2012/0057630 | A1 | 3/2012 | Saxena et al. |
| 2012/0128066 | A1 | 5/2012 | Shibahara et al. |
| 2012/0201298 | A1 | 8/2012 | Panusopone et al. |
| 2014/0092956 | A1 | 4/2014 | Panusopone et al. |

FOREIGN PATENT DOCUMENTS

| | | |
|---|---|---|
| WO | WO2010039015 | 4/2010 |
| WO | WO2011049399 | 4/2011 |

OTHER PUBLICATIONS

Lee T. et al., "TE12.1 Experimental results of transform unit quadtree/2-level test," MPEG Meeting, Guangzhou, China; No. M18238, Oct. 28, 2010.

Lee B. et al., "Hierarchical variable block transform," JCT-VC Meeting, Geneva, Switzerland; No. JCTVC-B050; Jul. 24, 2010.

Chen J. et al.; "TE(: Simulation results for various max. number of transform quadtree depth," MPEG Meeting, Guangzhou, China; No. M18236; Oct. 28, 2010.

Patent Cooperation Treaty, "International Search Report and Written Opinion of the International Searching Authority," for Int'l Application No. PCT/US2012/020167; Mar. 29, 2012.

Han et al., "Toward Jointly Optimal Spatial Prediction and Adaptive Transform in Video/Image Coding," ICASSP 2010 (Dallas, TX, Mar. 14-19, 2010).

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

McCann K. et al.; "Video coding technology proposal by samsung (and BBC)," JCT-VC Meeting; Dresden, Germany, Apr. 15, 2010.

Overview; VP7 Data Format and Decoder. Version 1.5. On2 Technologies, Inc. Dated Mar. 28, 2005.

Krit Panusopone et al., "Flexible Picture Partitioning", JCT-VC (Joint Collaborative Team on Video Coding) JCTVC-C260, Meeting, Oct. 7-Oct. 15, 2010.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

(56) References Cited

OTHER PUBLICATIONS

Sikora, T. et al., Shape-adaptive DCT for generic coding of video, Circuits and Systems for Video Technology, IEEE Transactions on vol. 5, Issue 1, p. 59-62, Feb. 1, 1995.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

T. Wiegand, H. Schwarz, B. Brozz, A. Fuldseth, X. Wang, W.-J. Han, "BoG report: residaul quadtree structure," JCTVC-C319_r1, Guangzhou, CN, Oct. 2010.

B. Bross, H. Kirchoffer, H. Schwarz, T. Wiegand, "Fast intra encoding for fixed maximum depth of transform quadtree," JCTVC-C311_r1, Guangzhou, CN, Oct. 2010.

T. Wiegand, B. Bross, J. Ohm, G. Sullivan, "WD1: Working Draft 1 of High-Efficiency Video Coding," JCTVC-C403, Guangzhou, CN, Oct. 7-15, 2010.

MacCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; JCTVC124; 42 pages.

Rath, G. et al: Improved predition and transform for spatial scalability, 20. JVT Meeting; 77 MPEG Meeting; Jul. 15, 2006; Klagenfurt, AT; JVT of ISO/IEC; JVT-T082, Jul. 16, 2006.

\* cited by examiner

PRIOR ART

FIG. 1A

PRIOR ART

EFFICIENT TRANSFORM UNIT REPRESENTATION

CROSS REFERENCE TO RELATED APPLICATIONS

The present application claims priority to U.S. Provisional App. No. 61/431,984 for "Efficient Transform Unit Representation" filed Jan. 12, 2011, the contents of which is incorporated herein by reference in their entirety.

The present application is related to U.S. application Ser. No. 13/328,965 for "Implicit Transform Unit Representation" filed concurrently, the contents of which is incorporated herein by reference in their entirety.

BACKGROUND

Particular embodiments generally relate to video compression.

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)). The standards typically use a fixed transform size (e.g., 4×4 or 8×8) in a macro block. However, if more than one transform size is used, then a macroblock level parameter may be required to indicate which transform size to use. Including this parameter increases the overhead as the macroblock level parameter needs to be encoded.

Figure 1A:
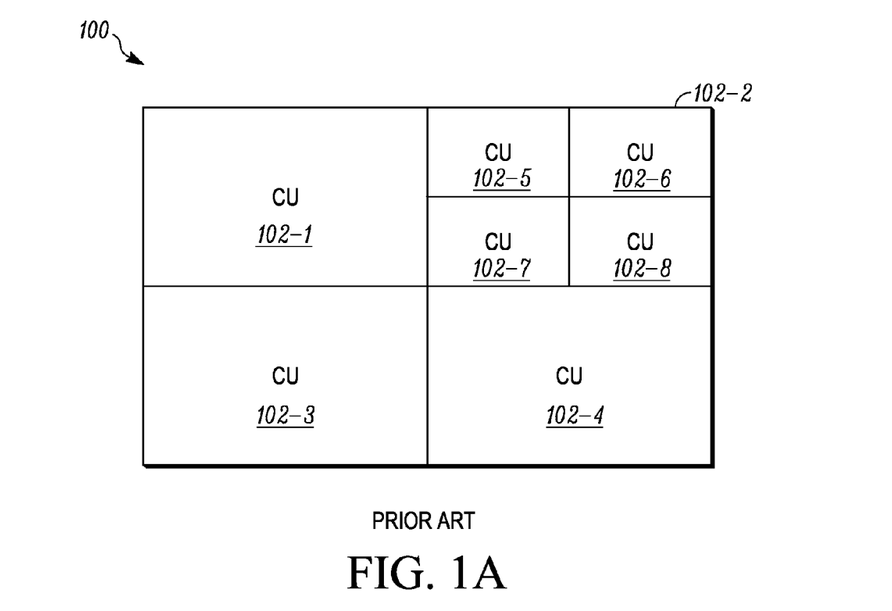
FIG. 1A shows an example of an LCU partition.

High efficiency video coding (HEVC) is also a block-based hybrid spatial and temporal predictive coding scheme. HEVC partitions an input picture into square blocks referred to as largest coding units (LCUs). Each LCU can be partitioned into smaller square blocks called coding units (CUs). FIG. 1a shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

Figure 1B:
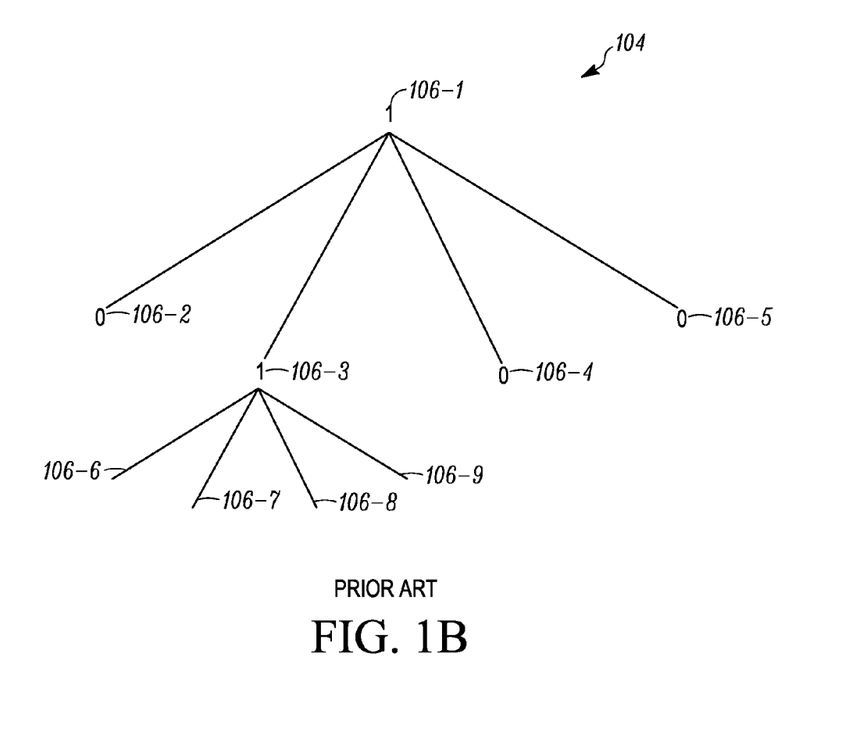
FIG. 1B shows a quadtree of the LCU partition shown in FIG. 1A.

A quadtree data representation is used to describe how LCU 100 is partitioned into CUs 102. FIG. 1b shows a quadtree 104 of the LCU partition shown in FIG. 1a. Each node of quadtree 104 is assigned a flag of "1" if the node is further split into four sub-nodes and assigned a flag of "0" if the node is not split. The flag is called a split bit (e.g. 1) or stop bit (e.g., 0) and is coded in a compressed bitstream.

A node 106-1 includes a flag "1" at a top CU level because LCU 100 is split into 4 CUs. At an intermediate CU level, the flags indicate whether a CU 102 is further split into four CUs. In this case, a node 106-3 includes a flag of "1" because CU 102-2 has been split into four CUs 102-5-102-8. Nodes 106-2, 106-4, and 106-5 include a flag of "0" because these CUs 102 are not split. Nodes 106-6, 106-7, 106-8, and 106-9 are at a bottom CU level and hence, no flag bit of "0" or "1" is necessary for those nodes because corresponding CUs 102-5-102-8 are not split. The quadtree data representation for quadtree 104 shown in FIG. 1b may be represented by the binary data of "10100", where each bit represents a node 106 of quadtree 104. The binary data indicates the LCU partitioning to the encoder and decoder, and this binary data needs to be coded and transmitted as overhead.

HEVC uses a block transform of either a square or non-square. Each CU 102 may include one or more prediction units (PUs). The PUs may be used to perform spatial prediction or temporal prediction.

Figure 2A:
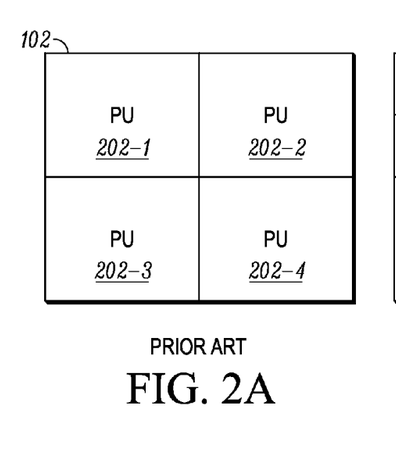
FIG. 2A shows an example of a CU partition of PUs
Figure 2B:
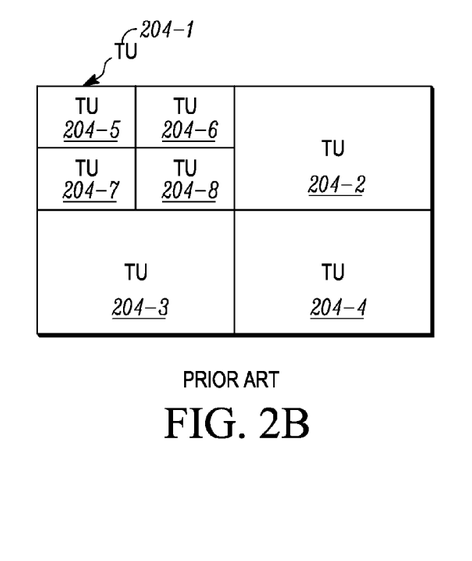
FIG. 2B shows a PU partitioning of a set of transform units (TUs).
Figure 2C:
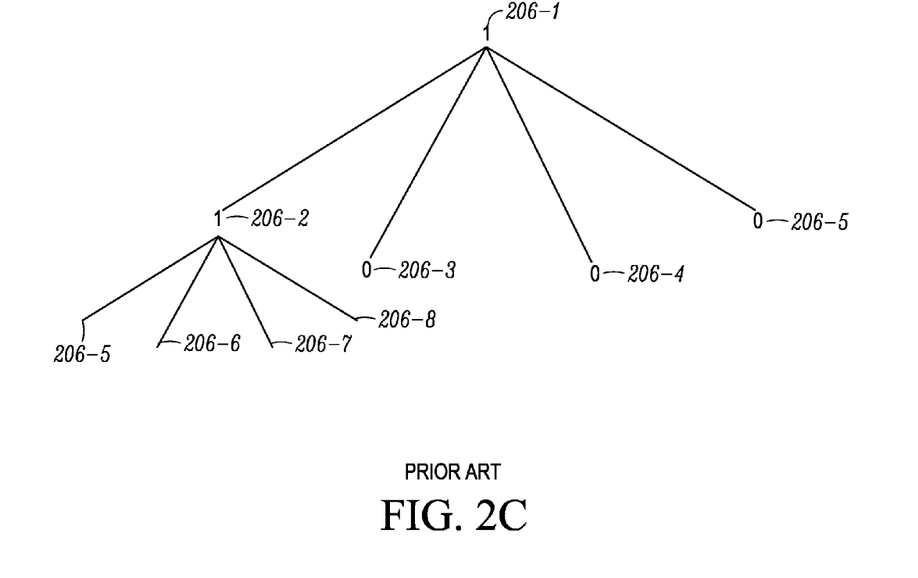
FIG. 2C shows an example of an RQT.

FIG. 2A shows an example of a CU partition of PUs. As shown, a CU 102 has been partitioned into four PUs 202-1-202-4. Unlike prior standards where only one transform of 8×8 or 4×4 is applied to a macroblock, a set of block transforms of different sizes may be applied to a CU 102. For example, the CU partition of PUs 202 shown in FIG. 2A may be associated with a set of transform units (TUs) 204 shown in FIG. 2B. In FIG. 2B, PU 202-1 is partitioned into four TUs 204-5-204-8. Also, TUs 204-2, 204-3, and 204-4 are the same size as corresponding PUs 202-2-202-4. Because the size and location of each block transform within a CU may vary, another quadtree data representation, referred to as a residual quadtree (RQT), is needed to describe the TU partitioning. FIG. 2c shows an example of an RQT. The RQT is derived in a similar fashion as described with respect to quadtree 104 for the LCU partitioning. For example, each node of the RQT may include a flag of "1" if CU 102 is split into more than one TU 204. A node 206-1 includes a flag of "1" because CU 102 is split into four TUs 204. Also, node 206-2 has a flag of "1" because TU 204-1 is split into four TUs 204-5-204-8. All other nodes 206 have a flag of "0" because TUs 204-2, 204-3, and 204-4 are not split. For the RQT data representation, binary data of "11000" also has to be encoded and transmitted as overhead. Having to encode and transmit the RQT data representation may be undesirable due to the added overhead and complexity.

A rate-distortion (RD) based approach is used to determine the coding units (CUs) within the LCU and the transform units within the CUs. The RD based approach may be costly in terms of additional complexity as every level of the quadtree 104 and the RQT is tested to determine if a node should be split. The RQT may be built from bottom to top, where the RD decision process starts from the smallest TU nodes (bottom TUs). A total RD cost of four TUs (children) is compared against their parent and a winner is then determined. If the winner is the parent, the node (parent) has no children. Otherwise, the node has four children where the RD cost is the sum of the four children. Then, the parent node will be further combined with its three siblings to compare with their parent node. The process repeats all the way to the CU level to have the final RQT tree shape. To keep the overhead and complexity relatively low, constraints may be applied to the RQT structure, such as the maximum size of a TU and the depth of the RQT. For example, the maximum TU size is set equal to the CU size. Also, the depth of the RQT determines the minimum size of a TU relative to the maximum TU size. For example, a tree depth may be set to two or three levels Limiting the depth limits the number of levels of partitioning that are available and the complexity of the RD decision.

Issues may result with the current RQT restrictions. First, the current RQT uses a short tree depth that implies a relatively balanced tree. In a balanced tree, the nodes at the same level within the RQT have more or less the same split or stop bit. The RQT representation for a balanced tree may not be as efficient a use of a block-based syntax where one TU size is applied to a CU or a PU, and each possible TU size is assigned a unique code word. For example, it would be more efficient to have a fixed transform size. Second, the maximum size of the TU is set to the CU size and the RD based decision approach is used to determine the TU sizes within a CU. The TU sizes and the positions of the TU within a CU are then represented by the RQT. The RD decision process may be complicated and adds complexity.

SUMMARY

In one embodiment, a method includes receiving a prediction unit (PU) for a coding unit (CU) of the video content. The method analyzes the prediction unit to determine a size of prediction unit. A size of a transform unit is determined based on the size of the prediction unit based on a set of rules. The set of rules specify the size of the transform unit is linked to the size of prediction unit and not a size of the coding unit. The method then outputs the size of the transform unit for use in a transform operation.

In one embodiment, an apparatus includes one or more computer processors and a computer-readable storage medium comprising instructions for controlling the one or more computer processors to be operable to: receive a prediction unit (PU) for a coding unit (CU) of the video content; analyze the prediction unit to determine a size of prediction unit; determine a size of a transform unit based on the size of the prediction unit based on a set of rules, wherein the set of rules specify the size of the transform unit is linked to the size of prediction unit and not a size of the coding unit; and output the size of the transform unit for use in a transform operation.

In one embodiment, a non-transitory computer-readable storage medium is provided comprising instructions for controlling the one or more computer processors to be operable to: receive a prediction unit (PU) for a coding unit (CU) of the video content; analyze the prediction unit to determine a size of prediction unit; determine a size of a transform unit based on the size of the prediction unit based on a set of rules, wherein the set of rules specify the size of the transform unit is linked to the size of prediction unit and not a size of the coding unit; and output the size of the transform unit for use in a transform operation.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 3A:
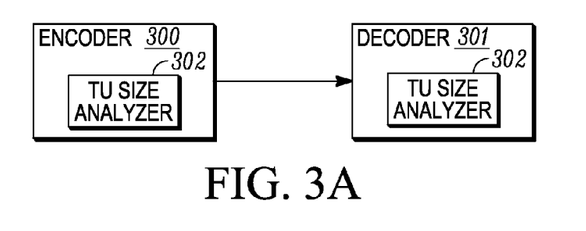
FIG. 3A depicts an example of a system for encoding and decoding video content according to one embodiment.

FIG. 3A depicts an example of a system for encoding and decoding video content according to one embodiment. The system includes an encoder 300 and a decoder 301, both of which will be described in more detail below.

Particular embodiments set a maximum transform unit (TU) size that is linked to a prediction unit (PU) size, instead of a coding unit (CU) size. A set of rules may be used to determine the TU size that simplifies the determination. Using the set of rules decreases the complexity of determining the TU size and also reduces overhead.

Encoder 300 and decoder 301 use an efficient transform unit representation to determine the TU size. For example, a TU size analyzer 302 may use different rules to determine a TU size. TU size analyzer 302 receives a size of a PU for a coding unit and determines a size of a TU based on a set of rules that are applied based on the size of the PU, and not the size of the CU. The different rules that may apply are described in more detail below.

Figure 3B:
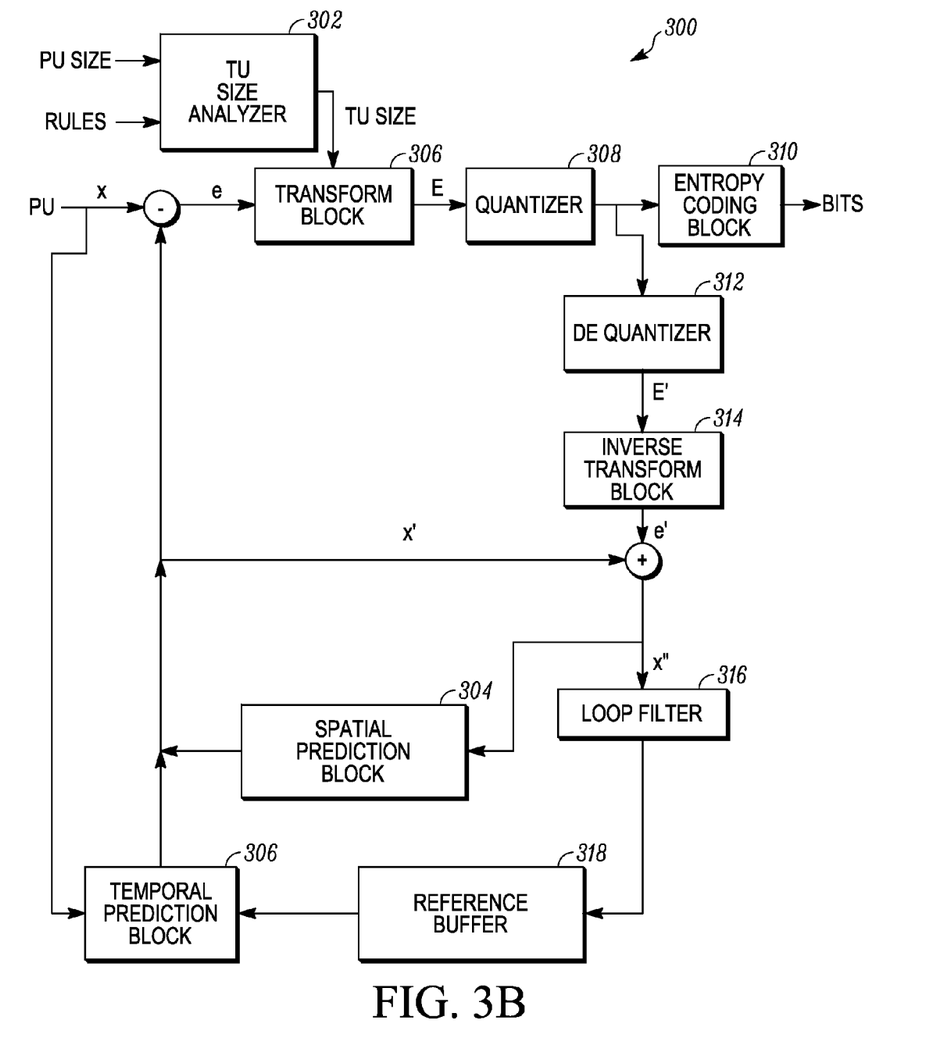
FIG. 3B depicts an example of an encoder according to one embodiment.

FIG. 3B depicts an example of an encoder 300 according to one embodiment. A general operation of encoder 300 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 304 may include different spatial prediction directions per PU, such as horizontal, vertical, 45-degree diagonal, 135-degree diagonal, DC (flat averaging), and planar.

A temporal prediction block 306 performs temporal prediction through a motion estimation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 306 performs a transform operation with the residual PU, e. Transform block 306 outputs the residual PU in a transform domain, E. The transform process using the TU size outputted by TU size analyzer 302 will be described in more detail below.

A quantizer 308 then quantizes the transform coefficients of the residual PU, E. Quantizer 308 converts the transform coefficients into a finite number of possible values. Entropy coding block 310 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 300, a de-quantizer 312 de-quantizes the quantized transform coefficients of the residual PU. De-quantizer 312 then outputs the de-quantized transform coefficients of the residual PU, e'. An inverse transform block 314 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A filter 316 performs de-blocking on the reconstructed PU, x", to reduce blocking artifacts. Additionally, loop filter 316 may perform a sample adaptive offset process after the completion of the de-blocking filter process for the decoded picture, which compensates for a pixel value offset between reconstructed pixels and original pixels. Also, loop filter 316 may perform adaptive filtering over the reconstructed PU, which minimizes coding distortion between the input and output pictures. Additionally, if the reconstructed pictures are reference pictures, the reference pictures are stored in a reference buffer 318 for future temporal prediction.

Figure 3C:
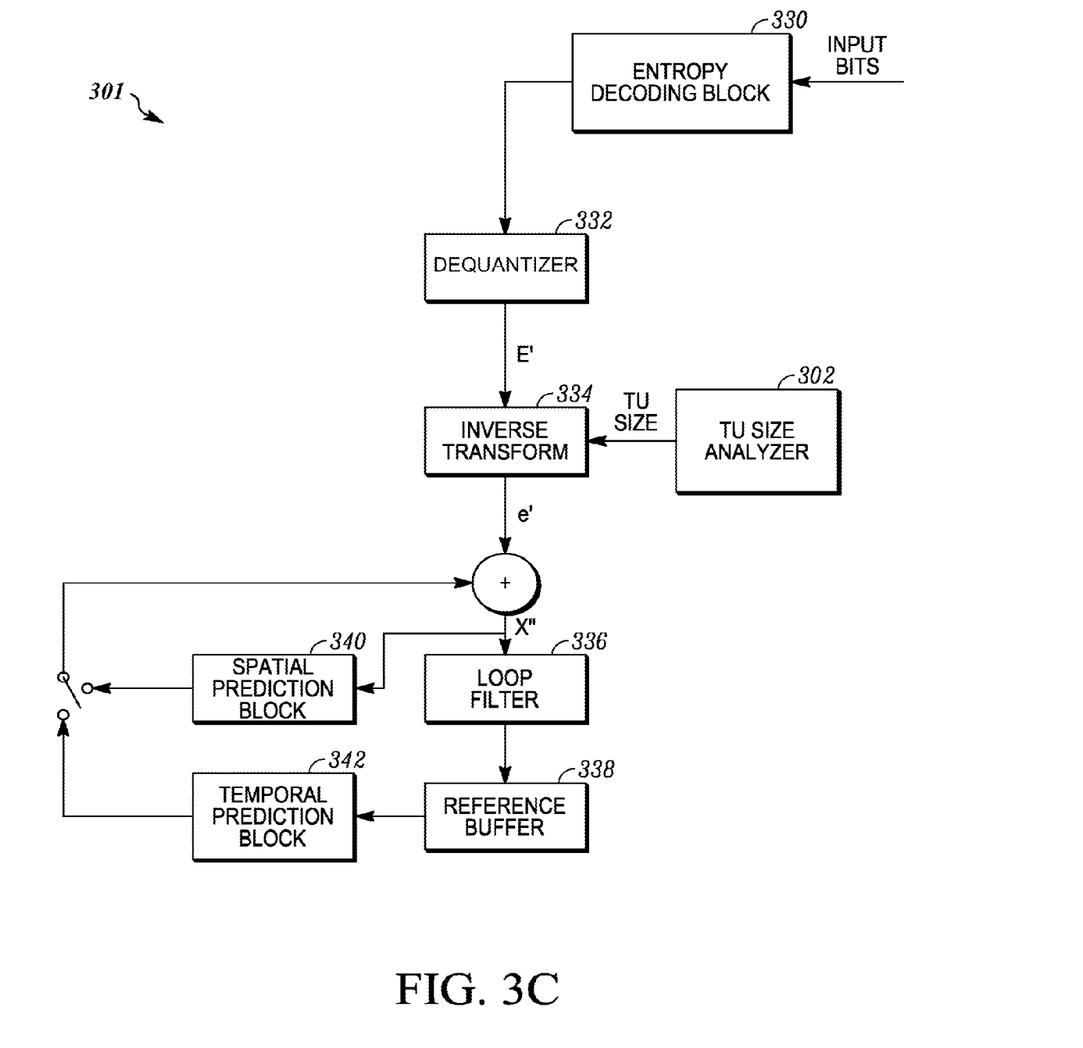
FIG. 3C depicts an example of a decoder according to one embodiment.

FIG. 3C depicts an example of decoder 301 according to one embodiment. A general operation of decoder 301 will now be described. It will be understood that variations in the decoding process described will be appreciated by a person skilled in the art based on the disclosure and teachings herein. Decoder 301 receives input bits from encoder 300 for compressed video content.

An entropy decoding block 330 performs entropy decoding on quantized transform coefficients of a residual PU. A de-quantizer 332 de-quantizes the quantized transform coefficients of the residual PU. De-quantizer 332 then outputs the de-quantized transform coefficients of the residual PU, e'. An inverse transform block 334 receives the de-quantized transform coefficients, which are then inverse transformed resulting in a reconstructed residual PU, e'. TU size analyzer 302 is used to output a TU size to a transform block 306. The transform process using the TU size outputted by TU size analyzer 302 will be described in more detail below.

The reconstructed PU, e', is then added to the corresponding prediction, x', either spatial or temporal, to form the new constructed PU, x". A loop filter 336 performs de-blocking on the reconstructed PU, x", to reduce blocking artifacts. Additionally, loop filter 336 may perform a sample adaptive offset process after the completion of the de-blocking filter process for the decoded picture, which compensates for a pixel value offset between reconstructed pixels and original pixels. Also, loop filter 336 may perform an adaptive loop filter over the reconstructed PU, which minimizes coding distortion between the input and output pictures. Additionally, if the reconstructed pictures are reference pictures, the reference pictures are stored in a reference buffer 338 for future temporal prediction.

The prediction PU, x', is obtained through either spatial prediction or temporal prediction. A spatial prediction block 340 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 342 performs temporal prediction through a motion estimation operation. A decoded motion vector is used to determine the prediction PU, x'. Interpolation may be used in the motion estimation operation.

Figure 4:
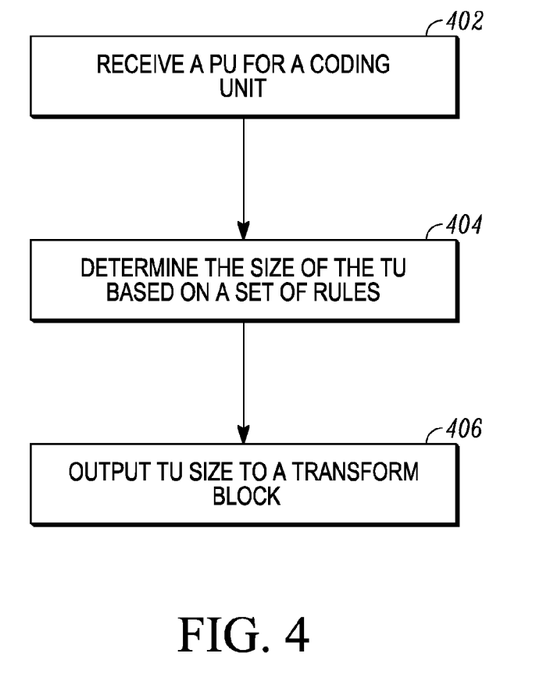
FIG. 4 depicts a simplified flowchart of a method for determining the TU size according to one embodiment.

As discussed above, TU size analyzer 302 may use different rules to determine the TU size. FIG. 4 depicts a simplified flowchart 400 of a method for determining the TU size according to one embodiment. At 402, TU size analyzer 302 receives a PU for a coding unit.

At 404, TU size analyzer 302 determines the size of the TU based on a set of rules that are applied based on the size of the PU, and not the size of the CU. Embodiments of different rules that TU size analyzer 302 may apply are described in more detail below. At 406, TU size analyzer 302 outputs the TU size to transform block 306. Transform block 306 then uses the TU size to transform the residual PU, e.

TU size analyzer 302 uses different embodiments of rules to determine the TU size. The rules may be used in combination or individually. In a first embodiment, the rules are used to eliminate the use of the RQT. For example, the RQT data representation is not encoded and transmitted with the compressed video, which reduces the complexity and overhead associated with the RQT.

In the first embodiment, the rules specify that given a PU (either a square block or a rectangular block), a corresponding TU is determined to be the same size as the PU. If the PU is a square block, the determined TU is a square block of the same size. If the PU is a rectangular block, the determined TU is a rectangular block of the same size.

In some instances, only a square shape transform is allowed and thus TU size analyzer 302 only determines TUs of square blocks. In this case, the rules may specify that the TU size is set to the size of a largest possible square block that can fit into the PU up to a specified size. For example, if a PU is 64×64 and the largest allowed size is 32×32, then the TU size is 32×32.

Similarly, in the case of rectangular PU, if the same size TU is not available, the TU is set to the largest possible rectangular TU allowed in the RQT that can fit into the rectangular PU.

Figure 5A:
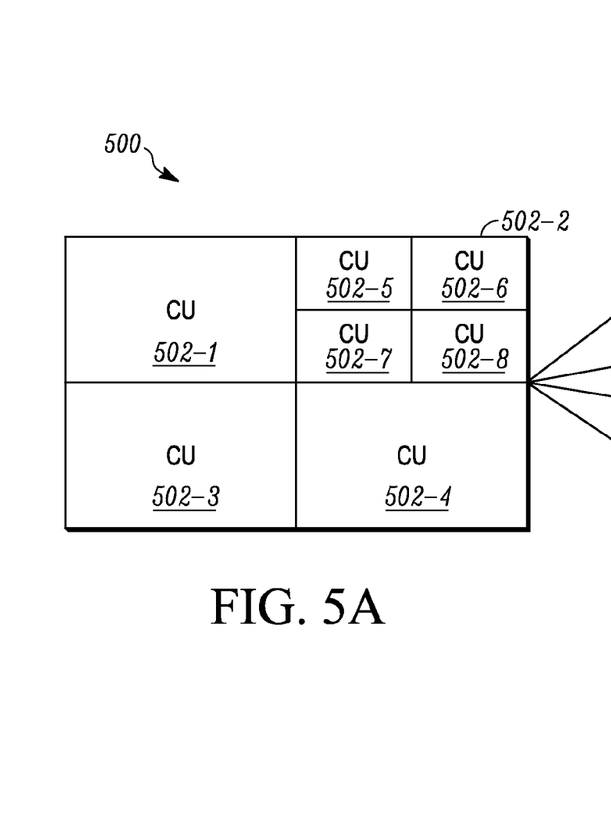
FIG. 5A shows an LCU is partitioned into CUs according to one embodiment.
Figures 5B, 5C:
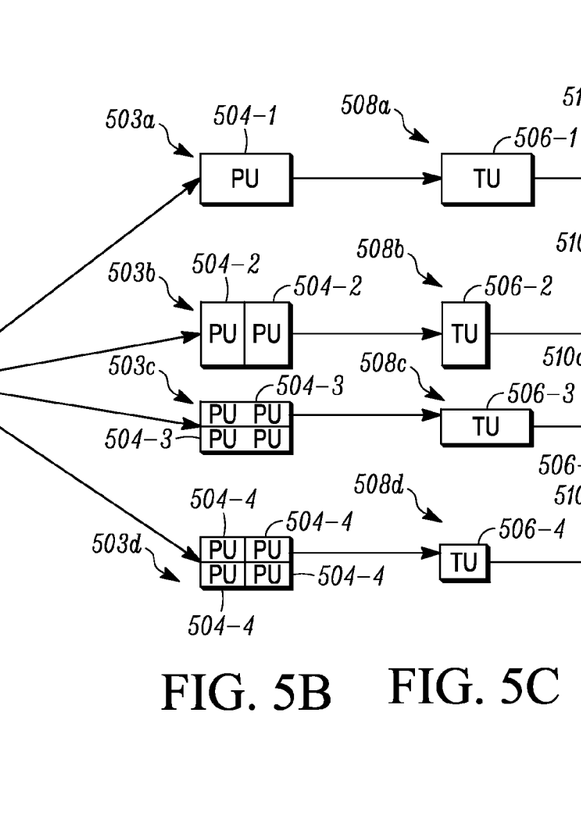
FIG. 5B shows four possible PU types for a given CU according to one embodiment.
FIG. 5C shows an example of TU sizes when square and rectangular transforms are allowed according to one embodiment.
Figure 5D:
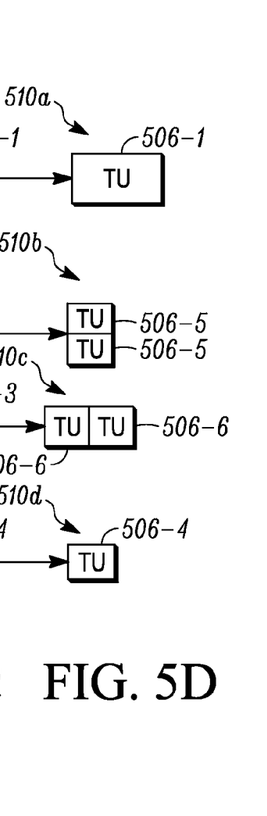
FIG. 5D shows an example of TU sizes when only a square transform is allowed according to one embodiment.

FIGS. 5A-5D show examples of TU sizes that are determined based on applying rules in the first embodiment to the PU size according to one embodiment. For example, FIG. 5C shows TU sizes with both square and rectangular TU sizes are allowed and FIG. 5D shows TU sizes when only square TU sizes are allowed. In FIG. 5A, an LCU 500 is partitioned into CUs 502. For example, LCU 500 is split into four CUs 502-1-502-4. Also, CU 502-2 is split into four CUs 502-5-502-8.

FIG. 5B shows four possible PU types for a given CU 502 according to one embodiment. For example, at 503a, a PU 504-1 is of the size 2N×2N, which means PU 504-1 is the same size as CU 502. At 503b, two PUs 504-2 are of the size 2N×N, which means PUs 504-2 are rectangular in shape and CU 502 has been vertically partitioned. At 503C, two PUs 504-3 are of the size N×2N, which means PUs 504-3 are rectangular in shape and CU 502 has been horizontally partitioned. At 503d, four PUs 504-4 are of the size N×N, which means PUs 504-4 are square in shape and a quarter of the size of CU 502. Different CUs 502 may contain different partitions of PU types.

Different TU sizes may be determined based on the PU size used. FIG. 5C shows an example of TU sizes when square and rectangular transforms are allowed according to one embodiment. For example, at 508a, TU size is equal to PU size (2N×2N). At 508b and 508c, TU size is a rectangular size equal to 2N×N and a rectangular size equal to N×2N, respectively. In 508d, TU size is a square size equal to the PU size (N×N).

FIG. 5D shows an example of TU sizes when only a square transform is allowed according to one embodiment. At 510a and 510d, the same TU size is selected as described in FIG. 5c because the TU sizes used were square transforms. However, at 510b and at 510c, the TU size selected is the maximum square block that can fit into the PU. For example, two TU blocks 506-1 and 506-2 (both N×N) may be inserted into either the vertical or horizontal PU 506-2 or 506-3. Accordingly, TU size analyzer 302 may use the above rules to determine the TU size. A decoder uses the same rules in the decoding process. Thus, an RQT data representation does not need to be encoded and transmitted with the compressed bitstream of the video content.

Figure 6:
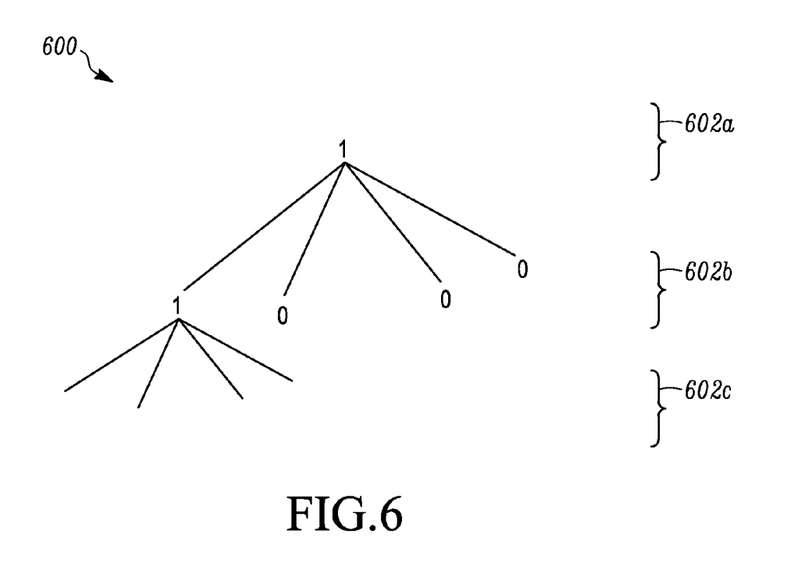
FIG. 6 shows an example of an RQT to illustrate the decision process according to one embodiment.

In a second embodiment, the RQT data representation may be encoded and transmitted with the compressed video content; however, a decision, such as the RD decision, to determine the TU size may be simplified using the rules. For example, if it is known via the rules that the TU size is linked to the PU size, then the decision to determine the TU size may be simplified because not all levels of the RQT need to be reviewed to determine the partitioning. Conventionally, the TU size may have been set to a maximum of the CU size. However, because TU size is linked to PU size and cannot be bigger than the PU size, certain decisions for partitioning at levels of the RQT may be skipped. FIG. 6 shows an example of an RQT 600 to illustrate the decision process according to one embodiment. RQT 600 may be the RQT for the TU partitioning shown in FIG. 2B. Because TU size is linked to the maximum PU size, TU size analyzer 302 does not need to analyze a level 602a, which represents the CU size. Rather, TU size analyzer 302 may start at a level 602c to determine if a parent node should be split into four TUs (children). If the parent should not be split, then the node (parent) has no children. Otherwise, the parent has four children. Then, the parent node will be further combined with its three siblings to compare with their parent node. The process repeats except that a level 602a does not need to be tested because TU size is not linked to the CU size. The test at level 602a normally decides if TU size should be the CU size, but TU size is not linked to the CU size and thus cannot be the CU size. Thus, only two levels 602 of RQT 600 need to be traversed instead of three. The encoding complexity is reduced because TU size analyzer 302 does not need to perform the full RD decision to determine the TU size. In the encoding process, a split bit at level 602 may not need to be the encoded, which reduces overhead. However, if the entire RQT data representation is encoded, the encoding and decoding processes may be less complex as the decision to determine the TU size is simplified.

In a third embodiment, the rules may specify a maximum TU size, a minimum TU size, and a depth of the RQT. However, the rules specify that for a given PU, a maximum TU size is the maximum size of a maximum square that can be fit into the PU. This may allow for a smaller minimum TU size within the same depth or a same minimum TU size with smaller depth. For example, by having this rule, smaller TU sizes may be included in the RQT of the same depth. If the depth of three levels for the RQT is provided, with CU size being 64×64 and PU size being 32×32, then the TU size may be 32×32, 16×16, or 4×4. These three sizes may be included in the RQT. Additionally, the depth of the RQT may be reduced because the split bit for the top level may not be encoded because TU size is linked to PU size, and not CU size.

Figure 7:
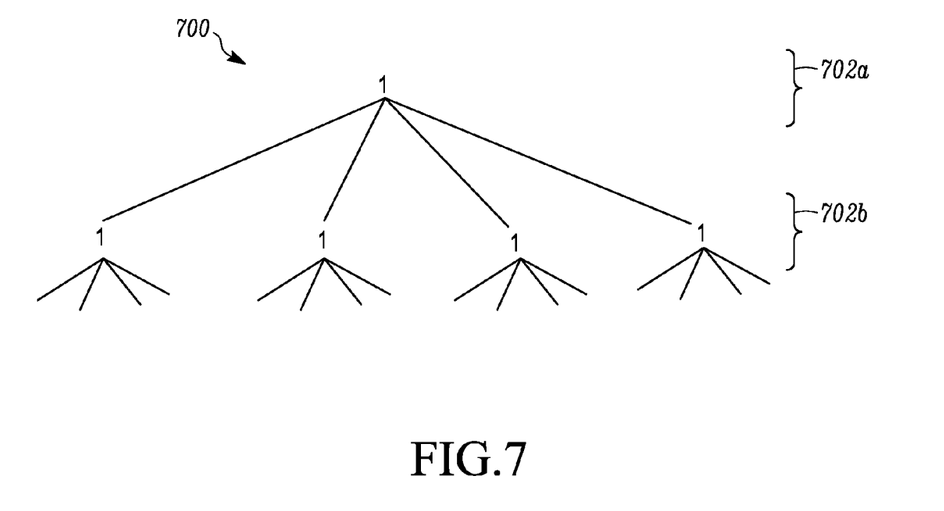
FIG. 7 depicts an example of an RQT according to one embodiment.

In a fourth embodiment, the rules specify that only one fixed size TU is allowed within a PU. In terms of the RQT, nodes at the same level of the RQT all have the same split/stop bit. Thus, depth information is required to describe the RQT, but not split/stop bits for the nodes. FIG. 7 depicts an example of an RQT 700 according to one embodiment. In a level 702a, a CU is partitioned into four TUs. In a level 702b, all TUs are partitioned into four TUs. If the TU is not broken up into any further TU partitions, then a stop bit of "0" is included for level 702b. The overhead of including split/stop bits may be removed and only depth information is sent. For example, for RQT 700, a depth of 3 is required. The bits that may be encoded may be "110" that indicate that level 702a and 702b are partitioned into smaller size TUs and level 702c is not partitioned. Thus, instead of sending a split/stop bit for every node in RQT 700, one bit is sent for each level 702. In one example, for a given PU of 64×16, the TU sizes allowed in the PU may be of a size 4×4, 8×8, or 16×16.

Accordingly, particular embodiments used an efficient transform unit representation by linking the TU size to the PU size. This allows for rules to be applied that simplify the complexity and overhead.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   receiving a prediction unit (PU) for a coding unit (CU) of the video content;
   determining, by a computing device, a size of a transform unit based on a size of the prediction unit based on a set of rules, wherein the set of rules specify the size of the transform unit is linked to the size of prediction unit and not a size of the coding unit; and
   outputting the size of the transform unit for use in a transform operation, wherein a residual quadtree representation (RQT) for a partitioning of the CU into transform units is not encoded and transmitted with a compressed bitstream of the video content.

2. The method of claim 1, wherein the set of rules specify the size of the transform unit is set to a size of a largest allowed size that fits in the size of the prediction unit.

3. The method of claim 1 wherein the set of rules specify the size of the transform unit is automatically set to a size of the prediction unit.

4. A method comprising:
   receiving a prediction unit (PU) for a coding unit (CU) of the video content;
   determining, by a computing device, a size of a transform unit based on a size of the prediction unit based on a set of rules, wherein the set of rules specify the size of the transform unit is linked to the size of prediction unit and not a size of the coding unit; and
   outputting the size of the transform unit for use in a transform operation, wherein a residual quadtree representation (RQT) for a partitioning of the CU into transform units is encoded and transmitted with a compressed bitstream of the video content, the RQT includes a plurality of layers, and the set of rules specify a decision determination for the TU size at at least one layer of the RQT is skipped in determining the size of the transform unit.

5. The method of claim 4, wherein the at least one layer is a top level layer at a CU size.

6. A method comprising:
receiving a prediction unit (PU) for a coding unit (CU) of the video content;
determining, by a computing device, a size of a transform unit based on a size of the prediction unit based on a set of rules, wherein the set of rules specify the size of the transform unit is linked to the size of prediction unit and not a size of the coding unit; and
outputting the size of the transform unit for use in a transform operation, wherein a residual quadtree representation (RQT) for a partitioning of the CU into transform units is encoded and transmitted with a compressed bitstream of the video content, the set of rules specify one fixed size of the transform unit is allowed for the prediction unit, and a depth parameter is required to control configuration of the RQT, but not a minimum size parameter for the transform unit and a maximum size parameter for the transform unit.

7. The method of claim 6, wherein nodes at a same level of the RQT have a same value for a bit representing a split or stop at the node.

8. The method of claim 7, wherein split or stop bits for nodes at the same level are not encoded for the RQT.

9. A method comprising:
receiving a prediction unit (PU) for a coding unit (CU) of the video content;
determining, by a computing device, a size of a transform unit based on a size of the prediction unit based on a set of rules, wherein the set of rules specify the size of the transform unit is linked to the size of prediction unit and not a size of the coding unit; and
outputting the size of the transform unit for use in a transform operation, wherein the set of rules specify the size of the transform unit is set to a size of a largest allowed size that fits in the size of the prediction unit, and a portion of a residual quadtree representation (RQT) for a partitioning of the CU into transform units is encoded and transmitted with a compressed bitstream of the video content based on the size of the largest allowed size that fits in the size of the prediction unit.

10. An apparatus comprising:
one or more computer processors; and
a non-transitory computer-readable storage medium comprising instructions for controlling the one or more computer processors to be operable to:
receive a prediction unit (PU) for a coding unit (CU) of the video content;
determine a size of a transform unit based on a size of the prediction unit based on a set of rules, wherein the set of rules specify the size of the transform unit is linked to the size of prediction unit and not a size of the coding unit; and
output the size of the transform unit for use in a transform operation, wherein a residual quadtree representation (RQT) for a partitioning of the CU into transform units is not encoded and transmitted with a compressed bitstream of the video content.

11. The apparatus of claim 10, wherein the set of rules specify the size of the transform unit is set to a size of a largest allowed size that fits in the size of the prediction unit.

12. The apparatus of claim 10, wherein the set of rules specify the size of the transform unit is automatically set to a size of the prediction unit.

13. An apparatus comprising:
one or more computer processors; and
a non-transitory computer-readable storage medium comprising instructions for controlling the one or more computer processors to be operable to:
receive a prediction unit (PU) for a coding unit (CU) of the video content;
determine a size of a transform unit based on a size of the prediction unit based on a set of rules, wherein the set of rules specify the size of the transform unit is linked to the size of prediction unit and not a size of the coding unit; and
output the size of the transform unit for use in a transform operation, wherein a residual quadtree representation (RQT) for a partitioning of the CU into transform units is encoded and transmitted with a compressed bitstream of the video content, wherein the RQT includes a plurality of layers, and the set of rules specify a decision determination for the TU size at at least one layer of the RQT is skipped in determining the size of the transform unit.

14. The apparatus of claim 13, wherein the at least one layer is a top level layer at a CU size.

15. An apparatus comprising:
one or more computer processors; and
a non-transitory computer-readable storage medium comprising instructions for controlling the one or more computer processors to be operable to:
receive a prediction unit (PU) for a coding unit (CU) of the video content;
determine a size of a transform unit based on a size of the prediction unit based on a set of rules, wherein the set of rules specify the size of the transform unit is linked to the size of prediction unit and not a size of the coding unit; and
output the size of the transform unit for use in a transform operation, wherein a residual quadtree representation (RQT) for a partitioning of the CU into transform units is encoded and transmitted with a compressed bitstream of the video content, the set of rules specify one fixed size of the transform unit is allowed for the prediction unit, and a depth parameter is required to control configuration of the RQT, but not a minimum size parameter for the transform unit and a maximum size parameter for the transform unit.

16. An apparatus comprising:
one or more computer processors; and
a non-transitory computer-readable storage medium comprising instructions for controlling the one or more computer processors to be operable to:
receive a prediction unit (PU) for a coding unit (CU) of the video content;
determine a size of a transform unit based on a size of the prediction unit based on a set of rules, wherein the set of rules specify the size of the transform unit is linked to the size of prediction unit and not a size of the coding unit; and
output the size of the transform unit for use in a transform operation, wherein the set of rules specify the size of the transform unit is set to a size of a largest square size that fits in the size of the prediction unit, and a portion of a residual quadtree representation (RQT) for the prediction unit is encoded and transmitted with a compressed bitstream of the video content based on the size of the largest allowed size that fits in the size of the prediction unit.

* * * * *